US007007243B2

(12) United States Patent
Baldino

(10) Patent No.: US 7,007,243 B2
(45) Date of Patent: Feb. 28, 2006

(54) METHOD AND APPARATUS FOR PRODUCING DIGITAL IMAGES WITH EMBEDDED IMAGE CAPTURE LOCATION ICONS

(75) Inventor: Robert L. Baldino, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 567 days.

(21) Appl. No.: 09/742,956

(22) Filed: Dec. 20, 2000

(65) Prior Publication Data

US 2004/0221244 A1 Nov. 4, 2004

(51) Int. Cl.
*G06K 15/00* (2006.01)

(52) U.S. Cl. ...................................... 715/853; 715/721

(58) Field of Classification Search ................ 345/855, 345/711–717, 8.4, 8.5, 802, 782, 772–773, 345/184, 169; 11/837–839; 701/117, 208; 348/239, 148; 715/853–855, 837, 839, 846–847, 715/712–713, 719–727, 968, 802, 804, 805, 715/838; 382/305, 312
See application file for complete search history.

(56) References Cited

U.S. PATENT DOCUMENTS

| | | | | |
|---|---|---|---|---|
| 5,493,677 A | | 2/1996 | Balogh et al. | |
| 5,517,605 A | | 5/1996 | Wolf | |
| 5,623,589 A | | 4/1997 | Needham et al. | 395/160 |
| 5,635,953 A | * | 6/1997 | Hayami et al. | 345/855 |
| 5,642,285 A | | 6/1997 | Woo et al. | 364/449.7 |
| 5,731,997 A | | 3/1998 | Manson et al. | 364/559 |
| 5,740,037 A | | 4/1998 | McCann et al. | 364/400 |
| 5,758,313 A | | 5/1998 | Shah et al. | |
| 5,765,176 A | | 6/1998 | Bloomberg | 707/514 |
| 5,784,059 A | | 7/1998 | Morimoto et al. | 345/353 |
| 5,790,121 A | | 8/1998 | Sklar et al. | |
| 5,798,733 A | | 8/1998 | Ethridge | 342/357 |
| 5,831,617 A | | 11/1998 | Bhukhanwala | |
| 5,832,298 A | | 11/1998 | Sanchez et al. | |
| 5,832,497 A | * | 11/1998 | Taylor | 707/104.1 |
| 5,897,220 A | | 4/1999 | Huang et al. | |
| 5,898,434 A | | 4/1999 | Small et al. | |
| 5,904,727 A | * | 5/1999 | Prabhakaran | 701/208 |
| 5,915,258 A | | 6/1999 | Toyokura | |
| 5,922,040 A | | 7/1999 | Prabhakaran | |
| 5,945,985 A | | 8/1999 | Babin et al. | |
| 5,973,692 A | * | 10/1999 | Knowlton et al. | 715/835 |
| 5,983,220 A | | 11/1999 | Schmitt | |
| 6,028,603 A | | 2/2000 | Wang et al. | |

(Continued)

*Primary Examiner*—Steven P. Sax
(74) *Attorney, Agent, or Firm*—David M. Woods

(57) ABSTRACT

A digital image production and display method and apparatus produce digital images (102) that include at least one iconic region (104) having one or more location icons (106) with a likeness corresponding to the geographic location at which a digital image was captured. The capture location iconic region (104) contains several hierarchical layers of linked icons **(106.1–106.*n*) varying from a general geographic location to a more specific one. A click on a thumbnail button in an icon displays a new icon with greater specificity of the geographic location of where the image was captured, culminating in one or more user-chosen icons representing very specific locations (106.1–106.5), and in the preferred embodiment, a hyperlink to a sponsor-chosen web site (106.*n*) on the World Wide Web. The icons are chosen from an icon library (432) to correspond to Global Positioning Satellite (GPS) information generated by a GPS receiver (424) integrated with or proximate with a digital camera (402)** when an image is captured.

20 Claims, 3 Drawing Sheets

U.S. PATENT DOCUMENTS

| | | | | |
|---|---|---|---|---|
| 6,088,648 | A * | 7/2000 | Shah et al. | 701/117 |
| 6,097,389 | A | 8/2000 | Morris et al. | |
| 6,107,961 | A | 8/2000 | Takagi | |
| 6,121,969 | A | 9/2000 | Jain et al. | |
| 6,144,968 | A | 11/2000 | Zellweger | |
| 6,148,148 | A | 11/2000 | Wain et al. | |
| 6,154,601 | A | 11/2000 | Yaegashi et al. | |
| 6,181,838 | B1 * | 1/2001 | Knowlton | 382/305 |
| 6,195,122 | B1 | 2/2001 | Vincent | |
| 6,202,061 | B1 | 3/2001 | Khosla et al. | |
| 6,204,840 | B1 | 3/2001 | Petelycky et al. | |
| 6,222,937 | B1 | 4/2001 | Cohen et al. | |
| 6,229,904 | B1 | 5/2001 | Huang et al. | |
| 6,282,362 | B1 * | 8/2001 | Murphy et al. | 386/46 |
| 6,301,586 | B1 | 10/2001 | Yang et al. | |
| 6,307,573 | B1 | 10/2001 | Barros | |
| 6,327,533 | B1 | 12/2001 | Chou | |
| 6,335,742 | B1 | 1/2002 | Takemoto | |
| 6,346,938 | B1 | 2/2002 | Chan et al. | |
| 6,351,556 | B1 | 2/2002 | Loui et al. | |
| 6,353,794 | B1 | 3/2002 | Davis et al. | |
| 6,366,296 | B1 | 4/2002 | Boreczky et al. | |
| 6,417,841 | B1 | 7/2002 | Doi et al. | |
| 6,429,885 | B1 | 8/2002 | Saib et al. | |
| 6,462,778 | B1 * | 10/2002 | Abram et al. | 348/239 |
| 6,480,665 | B1 | 11/2002 | Hamada | |
| 6,496,209 | B1 * | 12/2002 | Horii | 345/853 |
| 6,498,620 | B1 * | 12/2002 | Schofield et al. | 348/148 |
| 6,498,984 | B1 * | 12/2002 | Angew et al. | 701/207 |
| 6,519,415 | B1 | 2/2003 | Kim et al. | |
| 6,532,312 | B1 | 3/2003 | Corkran | |
| 6,542,174 | B1 * | 4/2003 | Senda et al. | 345/848 |
| 6,545,660 | B1 | 4/2003 | Shen et al. | |
| 6,567,980 | B1 | 5/2003 | Jain et al. | |
| 6,606,411 | B1 | 8/2003 | Loui et al. | |
| 6,608,650 | B1 | 8/2003 | Torres et al. | |
| 6,611,142 | B1 | 8/2003 | Jones et al. | |
| 6,613,100 | B1 | 9/2003 | Miller | |
| 6,657,702 | B1 | 12/2003 | Chui et al. | |
| 6,675,197 | B1 | 1/2004 | Satoh et al. | |
| 6,710,771 | B1 * | 3/2004 | Yamaguchi et al. | 345/184 |
| 6,738,075 | B1 * | 5/2004 | Torres et al. | 715/723 |
| 6,784,925 | B1 | 8/2004 | Tomat et al. | |
| 6,819,356 | B1 * | 11/2004 | Yumoto | 348/231.3 |
| 6,883,146 | B1 * | 4/2005 | Prabhu et al. | 715/854 |

* cited by examiner

METHOD AND APPARATUS FOR PRODUCING DIGITAL IMAGES WITH EMBEDDED IMAGE CAPTURE LOCATION ICONS

FIELD OF THE INVENTION

The present invention generally relates to digital images, especially with regard to their reproduction in an interactive environment such as via computers and wide area networks such as the Internet.

BACKGROUND OF THE INVENTION

Digital images have become commonplace in interactive media such as web pages on the World Wide Web. In many systems the image is captured by a digital camera and stored as an image file, which an online user can later view.

Prior art digital image display systems have recognized that users/viewers often have an interest in knowing from where an image is captured (the location of image recording device when the image was recorded). To accomplish this, some prior art digital image display systems require manual entry of information identifying the capture location in the form of a header or "watermark" in the image file. While this may give one who receives the image file an indication of where the image emanates, the user may still have to use great imagination to picture the location of capture. Additionally, the header information may not be in a user-friendly format, making deciphering necessary. Further, such systems are prone to mistakes due to human error in entering the capture location data.

One method of improving on the previously described system is to automate the capture location information gathering process by harnessing automatic location systems. For example, the Global Positioning Satellite (GPS) is a well-known method for pinpointing the location of a particular GPS receiver with a fairly high degree of accuracy. Other methods include the use of Radio Triangulation (RT) systems. Using such an approach, a GPS receiver can be either incorporated in the hardware of the digital camera, or located nearby. A subsequent image file will contain not only the raw image data, but also a date and time stamp, along with header information related to the location of the GPS receiver when the image is collected. While this approach may eliminate human errors, and introduce a higher degree of capture location accuracy, the header may still be difficult to decipher and the viewer is still required to use his/her imagination picturing the environs of the image capture location.

Thus, there is a great need wholly unaddressed by the prior art to provide a digital image capture and display system wherein the viewer of a digital image can also have an easy, user-friendly way to visualize the image capture location.

SUMMARY OF THE INVENTION

In view of the aforementioned problems and deficiencies of the prior art, the present invention provides a method for producing a digital image for display. The method at least includes the step of receiving position information corresponding to a geographical location where the digital image is captured. The method also novelly includes the steps of converting the position information into at least one user perceivable image capture location icon, and generating a display. The display at least includes the digital image and a capture location iconic region having at least one graphical image capture location icon.

The present invention also provides a system for producing a digital image for display. The system at least includes a position information receiver adapted to receive position information corresponding to a geographical location where the digital image is captured. The system also novelly includes an image capture location icon generator adapted to convert the position information into at least one user perceivable image capture location icon, and a display generator adapted to generate a display. The display at least includes the digital image and a capture location iconic region, which may be user definable, having at least one graphical image capture location icon.

BRIEF DESCRIPTION OF THE DRAWINGS

Features and advantages of the present invention will become apparent to those skilled in the art from the description below, with reference to the following drawing figures, in which.

DETAILED DESCRIPTION OF THE INVENTION

As will be described below in more detail, the present invention novelly converts the capture location data included in an image file into one or more icons having a likeness corresponding to the geographic region of capture. The icon is automatically chosen from a library of capture location icons. In the preferred embodiment, a user/sponsor responsible for hosting the digital image (such as via a web site) can also add custom icons representing, for example, showing a particular attraction, institution, building or other physical indicia. The capture location icons are embedded in the displayed digital image in a layered fashion.

Figure 1:
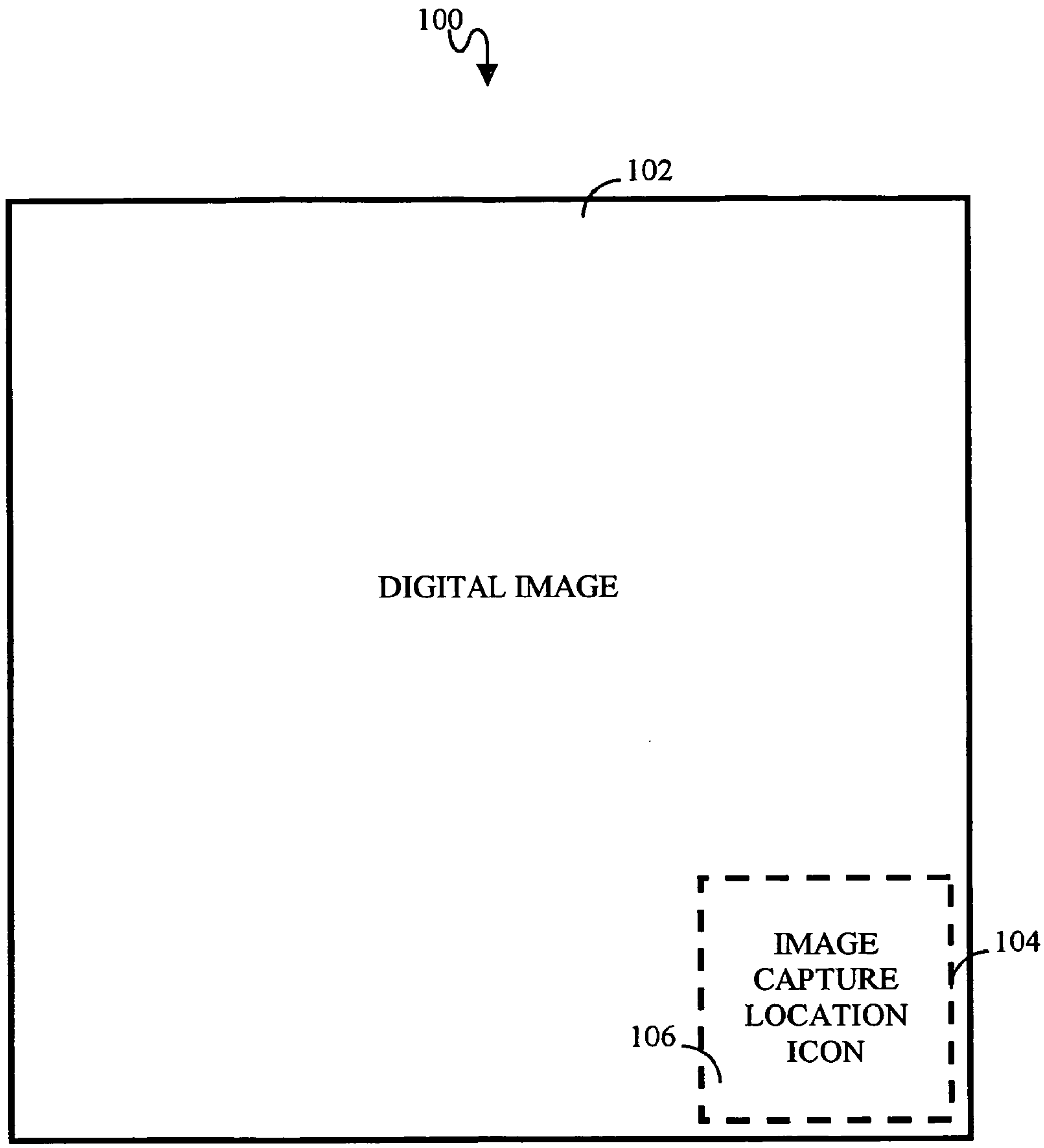
FIG. 1 is an example of a displayed digital image having a present-inventive image capture location iconic region, and one or more present-inventive image capture location icons.

FIG. 1 illustrates a digital image display 100 produced in accordance with the present invention. The display 100 might appear, for example, on a web page. Alternatively, the display 100 might be produced by the computer of an online user having application software for producing a display according to the present invention, when the user downloads an image file with GPS metadata. Per the present invention, the display 100 includes a digital image 102 and an image capture location iconic region 104, which includes one or more layers of linked image capture location icons 106.

An image capture location icon 106 contains a picture representing the geographic location where the image was captured. In the preferred embodiment, the layers of image capture location icons are hierarchically arranged from a picture representing the most general geographic location on the top layer, to a picture representing the most specific geographic location on the bottom layer. This is more apparent from viewing FIGS. 2 and 3, where several icons 106.1 through 106.*n* are shown.

The icon 106.1—the first one seen by a user/viewer—is the most general one in the preferred embodiment. It shows a picture of a broad geographic region such as the continent from which the image was captured. For example, if the image was captured in the United States of America, the icon 106.1 might be a map (a simple map or an outline) with the continental United States prominently displayed. The icons have regions which can be activated with a pointing device such as a "mouse" to move to another icon with greater location specificity.

As an example, the digital image might be from the U.S. Space Camp in Huntsville, Ala., United States of America. In this case the icon 106.1 is a picture or map of the United States. The user can click on a star or other indicia, or anywhere within the icon, to activate the next icon layer 106.2 to display a map of the State of Alabama. The next layer 106.3 might be a map or picture of the City of Huntsville, and can be activated by clicking within the icon 106.2.

Along with the standard icons which can be automatically inserted from an image capture location icon library, the application or data server hosting the digital image can also include custom icons providing more information about the capture location. In the U.S. Space Camp example, the host application or server can include an icon 106.4 representing U.S. Space Camp as the next layer, followed by a layer 106.5 representing a particular exhibit, such as "History of Rockets." The last layer 106.*n* in the example might be a hyperlink to a web page containing more information about an attraction, products or the like of the web page sponsor, so that an online user can connect to the web page for further information.

In the example above, a user viewing images with an application on a host displaying digital images according to the present invention, might see a picture of rocketry artifacts. Within the larger picture is an iconic region 104 where the icons 106 are superimposed. The online user interested in the origin of image can click on the icons 106 for visual, user-friendly information.

Figure 4:
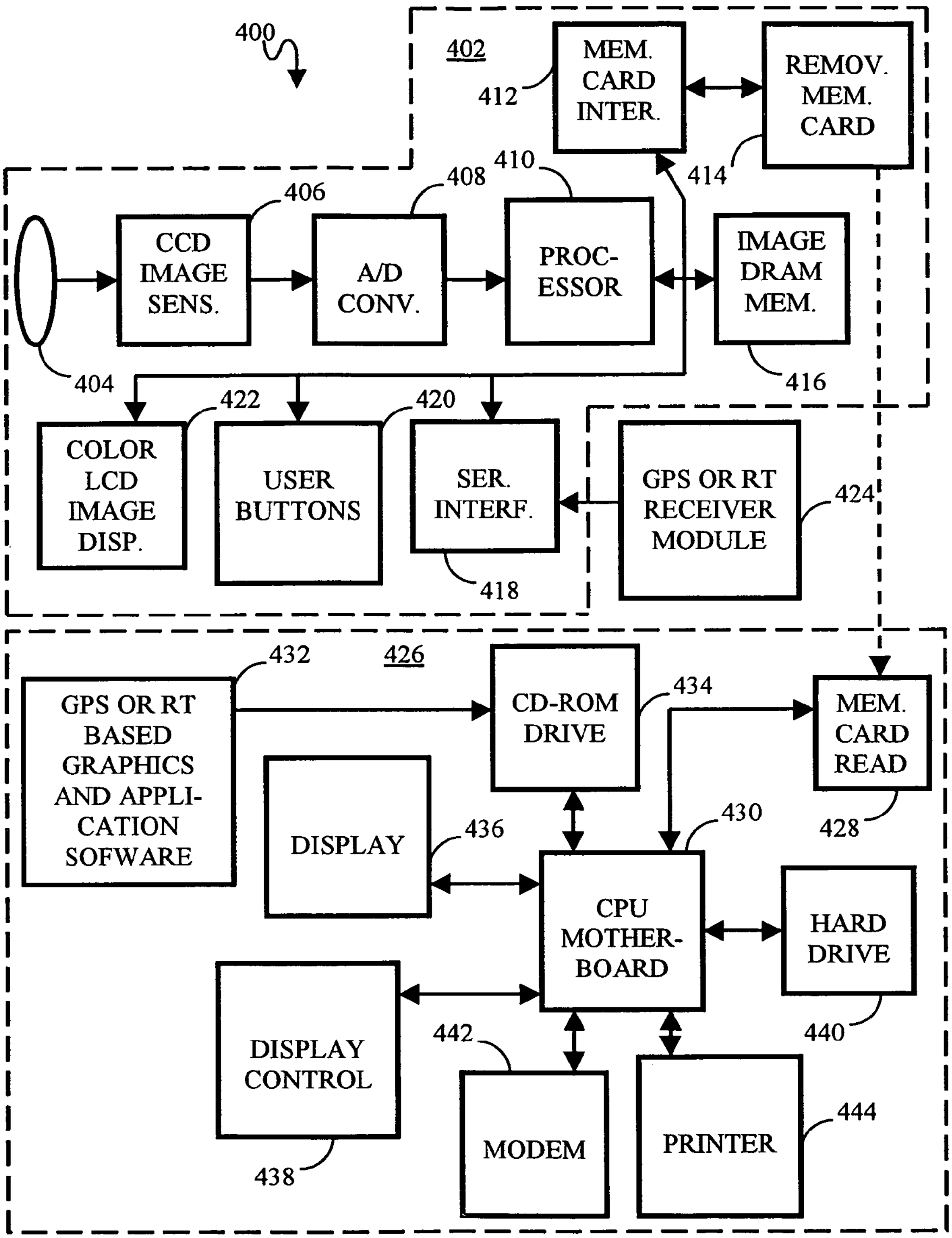
FIG. 4 is a schematic block diagram of the basic hardware for producing the present-inventive digital images with embedded image capture location iconic regions, and image capture location icons.

FIG. 4 details the preferred embodiment for a system 400 for capturing and displaying digital images according to the present invention. A digital still camera 402 that captures digital images to be displayed has some or all of the following general components, as will be understood by those skilled in the art: a lens 404 for capturing the light representing an image; a charge-coupled device (CCD) image sensor 406 or other electronic image capture device for converting the light into an analog electrical signal; an analog-to-digital (A/D) converter 408 for converting the analog signal into a digital signal; a processor 410 for receiving the digital image and controlling the overall operation of the camera 402; an image Dynamic RAM (DRAM) 416 for dynamically storing images; a memory card interface 412; a removable memory card 414; a serial, parallel or data interface 418; various user control buttons 420; and a liquid crystal display (LCD) 422 for displaying interactive information and/or images to the camera user.

In accordance with the present invention, the system 400 also includes a position information receiver module 424. The position receiver is a GPS receiver in the preferred embodiment, but can use other types of location technology as well, such as Radio Triangulation (RT). While the GPS receiver is shown as a separate unit in FIG. 4, those skilled in the art will appreciate that it is possible to include the GPS receiver inside of the digital camera. The GPS receiver module 424 supplies the processor 410 with precise latitude and longitude information via the serial or other digital interface 418. When an image frame is captured and digitized, along with date and time stamping the image information, the processor also adds location information (or location "metadata") to the image data in an image file to be stored in memory 414. The location information is stored either in the form of a header entry or a watermark in the image, or both.

Figure 2:
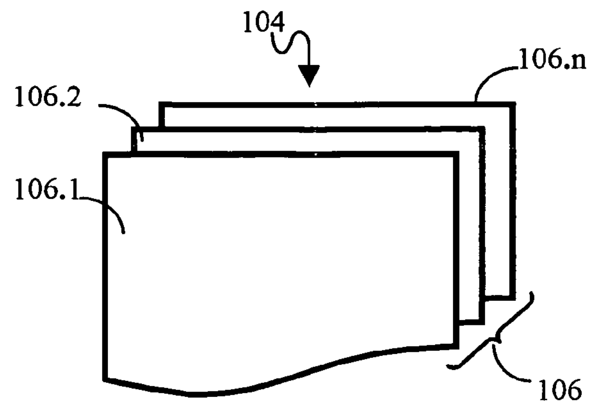
FIG. 2 is a more detailed version of the present-inventive image capture location iconic region and image capture location icons.
Figure 3:
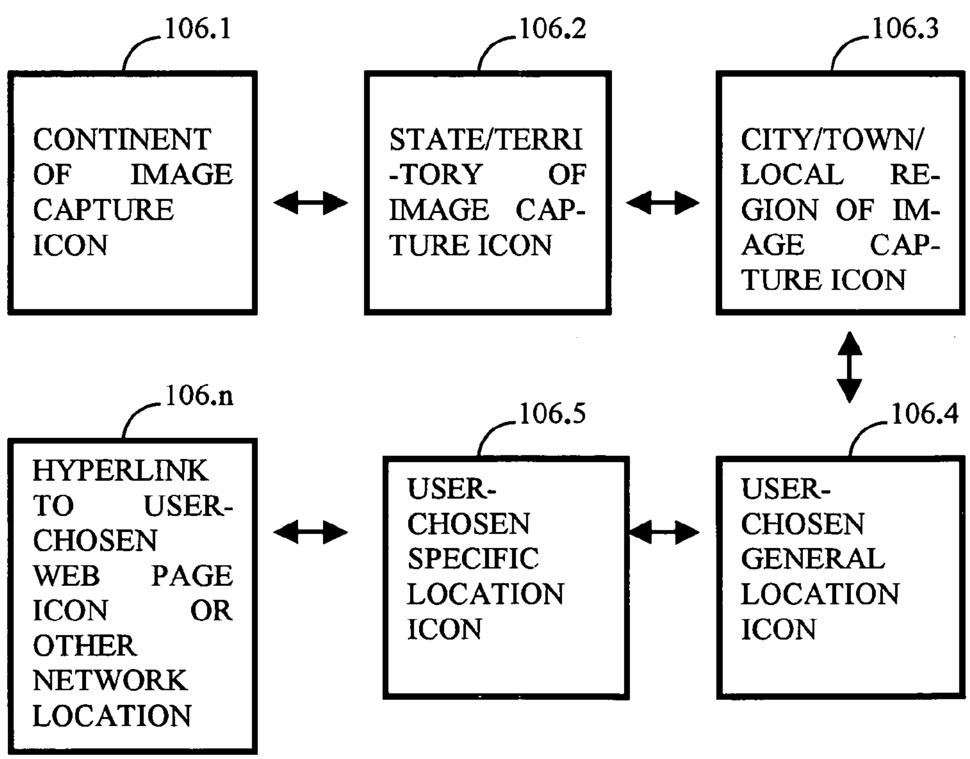
FIG. 3 is an example of image capture location icons which can be included in the present-inventive image capture location iconic region.

A display circuit 426 receives the digital image file for further processing from the memory card 414 via a memory card reader 428, or other means of data transfer. It will be appreciated by those skilled in the art that that the memory card 414 and the memory card reader 428 can be replaced by a permanent memory, and a communication link, respectively. A personal computer and application software can subsume the display circuit. In the preferred embodiment, the display circuit 426 is part of a personal computer operated by an online/offline user/customer who receives or loads digital image files with GPS metadata. In an alternate embodiment, the display circuit 426 is part of an application server for hosting a web page displaying digital images in accordance with the present invention, as shown in FIGS. 1–3. Using this latter approach, online users need not have special application software on their computers to enable them to view the image capture location icons of the present invention.

A display circuit CPU 430 receives the image file for further processing needed for display. A library of special icons corresponding to predefined GPS latitude-longitude combinations (from the GPS metadata) supplies preexisting icons to the CPU for display. In the preferred embodiment, the icon library as well as application software reside on the hard drive 440 or application server or on a web site.

The display 436, display control (e.g., keyboard) 438, modem 442, printer 444 and hard drive 440 all have the typical functions of a computer system. In this arrangement, the hard drive 440 can of course store images in the iconic form of the present invention, while the modem 442 could operate to, among other things, connect the display computer to a source for digital images with GPS location data, such as the Internet or other wide area networks. This could also be accomplished by use of a network interface card, LAN or WAN, wired or wireless.

Variations and modifications of the present invention are possible, given the above description. However, all variations and modifications which are obvious to those skilled in the alt to which the present invention pertains are considered to be within the scope of the protection granted by this Letters Patent. For example, the present invention could be implemented on other display systems, such as a personal digital assistant (PDA), a digital picture frame, or the like.

For example, the icons in the present invention are not limited to being map-like in appearance, but may also be any logo or other indicia.

PARTS LIST

100 Digital image display
102 Digital image
104 Image capture location iconic region
106 Image capture location icons
106.1 Continent of image capture icon
106.2 State/territory of image capture icon
106.3 City/town/local region of image capture icon
106.4 User-chosen general location icon

106.5 User-chosen specific location icon
106.*n* Hyperlink to user-chosen web page icon
400 System for capturing and displaying digital images
402 Digital still camera
404 Camera lens
406 CCD image sensor
408 Analog-to-Digital Converter
410 Processor
412 Memory card interface
414 Memory card
416 Image Dynamic RAM
418 Serial interface
420 User control buttons
424 Position information receiver module
426 Display circuit
428 Memory card reader
430 Display circuit CPU
432 CD-ROM
434 CD-ROM drive
436 display
438 display control
440 hard drive
442 modem
444 printer

What is claimed is:

1. A method for producing geographical information to be presented with a a digital image for display, said method comprising the steps of:

receiving position information corresponding to a geographical location where said digital image is captured;

converting said position information into at least one user perceivable image capture location icon comprising, at least in part, an image representing the geographical location where said digital image is captured; and generating a display presenting both said digital image and an associated capture location iconic region, said capture location iconic region comprising an associated a plurality of hierarchically layered image capture location icons arranged according to geographic specificity.

2. The method in claim 1 wherein said position information is from a Global Positioning Satellite/System (GPS).

3. The method in claim 1 wherein said capture location icons are interactive.

4. The method in claim 1 wherein said image capture location icons are linked, and activated for display by a user.

5. The method in claim 1 wherein said capture location iconic region further comprises a web site icon having a hyperlink to web site or other network database.

6. The method in claim 5 wherein said web site icon is layered with said image capture location icons.

7. The method in claim 1 wherein said capture location iconic region further comprises at least one icon corresponding to an entity affiliated with said image capture location.

8. The method in claim 1 wherein said converting step comprises the steps of accessing an icon graphics library having multiple location icons; and generating an icon from said icon graphics library based upon said position information.

9. The method in claim 1 wherein said position information is from a Radio Triangulation (RT) System.

10. A system for producing geographical information to be presented with a digital image for display, said system comprising:

a position information receiver adapted to receive position information corresponding to a geographical location where said digital image is captured;

an image capture location icon generator adapted to convert said position information into at least one user perceivable image capture location icon comprising, at least in part, an image representing the geographical location where said digital image is captured; and a display generator adapted to generate a display presenting both said digital image and an associated capture location iconic region, said capture location iconic region an associated a plurality of hierarchically layered image capture location icons arranged according to geographic specificity.

11. The system in claim 10 wherein said position information is from a Global Positioning Satellite/System (GPS).

12. The system in claim 10 wherein said capture location icons are interactive.

13. The system in claim 10 wherein said image capture location icons are linked, and activated for display by a user.

14. The system in claim 10 wherein said capture location iconic region further comprises a web site icon having a hyperlink to web site.

15. The system in claim 14 wherein said web site icon is layered with said image capture location icons.

16. The system in claim 10 wherein said capture location iconic region further comprises at least one icon corresponding to an entity affiliated said image capture location.

17. The system in claim 10 wherein said image capture location icon generator comprises an icon graphics library having multiple location icons, from which an icon from said icon graphics library is generated based upon said position information.

18. The system in claim 10 wherein said position information is from a Radio Triangulation (RT) System.

19. The system in claim 10 further including a digital camera adapted to capture a digital image.

20. A processing unit for producing geographical information to be presented with a digital image for display, comprising:

a position information receiver circuit adapted to receive position information corresponding to a geographical location where a digital image has been captured;

an image capture location icon generator circuit adapted to convert said position information into a plurality user perceivable image capture location icons with each icon comprising, at least in part, an image that represents the geographical location where said digital image is captured and with each image providing a different level of specificity of information about the geographical location; and a display generator adapted to generate at least one display image presenting both said digital image and an associated capture location iconic region wherein said capture location iconic region comprises a plurality of image capture location icons with each image capture location icon being linked to another image capture location icon in a hierarchically layered arrangement so that activation thereof by a user causes a different one of the icons to be presented in the capture location iconic region.

* * * * *

UNITED STATES PATENT AND TRADEMARK OFFICE

CERTIFICATE OF CORRECTION

PATENT NO. : 7,007,243 B2
APPLICATION NO. : 09/742956
DATED : February 28, 2006
INVENTOR(S) : Robert L. Baldino It is certified that error appears in the above-identified patent and that said Letters Patent is hereby corrected as shown below:

Claim 10, Col. 6, line 12
replace "an associated a" with --comprising an associated--

Signed and Sealed this

Eighth Day of August, 2006

JON W. DUDAS
*Director of the United States Patent and Trademark Office*